(12) United States Patent
Ko

(10) Patent No.: US 7,221,112 B2
(45) Date of Patent: May 22, 2007

(54) CATHODE RAY TUBE DISPLAY APPARATUS

(75) Inventor: Sung-cheol Ko, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/930,836

(22) Filed: Sep. 1, 2004

(65) Prior Publication Data

US 2005/0057197 A1   Mar. 17, 2005

(30) Foreign Application Priority Data

Sep. 17, 2003   (KR) .................. 10-2003-0064482

(51) Int. Cl.
*G01G 1/04* (2006.01)
(52) U.S. Cl. .................. 315/408; 315/387; 348/637
(58) Field of Classification Search ................. 315/371, 315/384, 387, 408, 411, 369; 348/634, 637
See application file for complete search history.

(56) References Cited

U.S. PATENT DOCUMENTS

| | | | | |
|---|---|---|---|---|
| 5,019,754 | A | * | 5/1991 | Onozawa et al. ........... 315/408 |
| 5,932,977 | A | * | 8/1999 | Woo ........................... 315/384 |
| 6,119,225 | A | * | 9/2000 | Kim ............................... 713/1 |
| 6,124,686 | A | * | 9/2000 | Kikuchi et al. ............. 315/408 |
| 2004/0141340 | A1 | * | 7/2004 | Yasumura ..................... 363/40 |

FOREIGN PATENT DOCUMENTS

| | | |
|---|---|---|
| JP | 4-175908 | 6/1992 |
| JP | 11-55940 | 2/1999 |
| JP | 2001-57779 | 2/2001 |
| JP | 2002-223563 | 8/2002 |
| JP | 2002-369504 | 12/2002 |
| KR | 172697 | 10/1998 |
| KR | 1998-83735 | 12/1998 |
| KR | 1999-3558 | 1/1999 |
| KR | 2000-28432 | 5/2000 |
| KR | 20-204874 | 9/2000 |
| KR | 20-214795 | 12/2000 |
| KR | 2000-73377 | 12/2000 |
| KR | 2001-10985 | 2/2001 |
| KR | 20-266878 | 2/2002 |
| KR | 2003-15752 | 2/2003 |

* cited by examiner

*Primary Examiner*—Tuyet Vo
*Assistant Examiner*—Jimmy Vu
(74) *Attorney, Agent, or Firm*—Staas & Halsey LLP

(57) ABSTRACT

A cathode ray tube display apparatus having a fly back transformer (FBT) to induce and output high voltage, the CRT apparatus including: a power controller controlling source power input into the FBT; a DC power detector to output a shut-off signal to shut off an operation of the power controller if the DC power detector is supplied with a direct current signal. The CRT display apparatus provides for normal operation of a system while protecting circuit components from abnormal operation of the system.

14 Claims, 2 Drawing Sheets

CATHODE RAY TUBE DISPLAY APPARATUS

CROSS-REFERENCE TO RELATED APPLICATIONS

This application claims the benefit of Korean Patent Application No. 2003-64482, filed Sep. 17, 2003, in the Korean Intellectual Property Office, the disclosure of which is incorporated herein by reference.

BACKGROUND OF THE INVENTION

1. Field of the Invention

The present invention relates to a cathode ray tube (CRT) display apparatus, or more specifically, to a CRT display apparatus having a driving IC to control the high voltage output of a fly back transformer (FBT)

2. Description of the Related Art

A CRT display apparatus is an apparatus to display a picture by displaying a plurality of pixels on a screen using electric charges which are discharged from a cathode ray tube and impact a fluorescent plate.

To discharge and control the electric charges in the cathode ray tube, an extremely high voltage must be applied. The high voltage can be acquired by using an induction coil having a high turn ratio. A module comprising a plurality of such induction coils is called an FBT. When the input source voltage is about 140-200V, the high voltage induced in the secondary induction coil is about 26 kV.

Generally, a high voltage driving IC is used on an input part of the FBT to drive the source voltage.

The high voltage driving IC applies a pulse width modulation (PWM) signal into a primary induction coil of the FBT. The high voltage driving IC also controls a duty ratio to acquire a required output from the FBT if a step-up circuit is in use. The high voltage driving IC is provided with a series of rectangular pulses as a synchronization signal or as a control signal to decide the duty ratio of an output waveform. The high voltage driving IC may use a PWM control IC examples of which include models such as, UC3842 and TL494CN.

However, if a direct current signal is applied to the high voltage driving IC due to abnormal operation of the system, a conventional high voltage driving circuit may have a problem resulting in unstably driving the high voltage driving IC and a circuit component of an output part connected to an output terminal. Accordingly, if a direct current signal is applied to the high voltage driving IC over a predetermined period of time, a circuit component connected to the output terminal such as a transistor may be damaged due to an abnormal output signal from the high voltage driving IC.

SUMMARY OF THE INVENTION

Accordingly, it is an aspect of the present invention to provide a cathode ray tube (CRT) display apparatus to protect a circuit component by shutting off the output from a high voltage driving IC if a direct current signal is applied to the high voltage driving IC.

Additional aspects and advantages of the present invention will be set forth in part in the description which follows and, in part, will be obvious from the description, or may be learned by practice of the invention.

The foregoing and/or other aspects of the present invention are achieved by a CRT display apparatus having a fly back transformer (FBT) to induce and output a high voltage, the CRT apparatus comprising: a power controller to control the source power being input into the FBT; and a DC power detector to output a shut-off signal to shut off the power controller if the DC power detector detects a direct current signal.

According to an aspect of the present invention, the DC power detector comprises a condenser connected in series to a line supplied with a direct current signal, and a transistor biased by an alternating current signal passing through the condenser; wherein the transistor outputs the shut-off signal to the power controller if the condenser is supplied with the direct current signal.

According to an aspect of the present invention, the power controller comprises an output switch to switch the input of the source power, and a high voltage driving IC to control turning on/off the output switch.

According to an aspect of the present invention, the CRT display apparatus further comprises a duty controller supplied with a series of rectangular pulses, wherein a duty ratio of the series of rectangular pulses is changed and the series of rectangular pulses is output to the DC power detector.

According to an aspect of the present invention, the CRT display apparatus further comprises a feedback circuit to feed back the output voltage of the FBT to the power controller, wherein the power controller controls the source power based on the output voltage of the FBT which is fed back by the feedback circuit.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
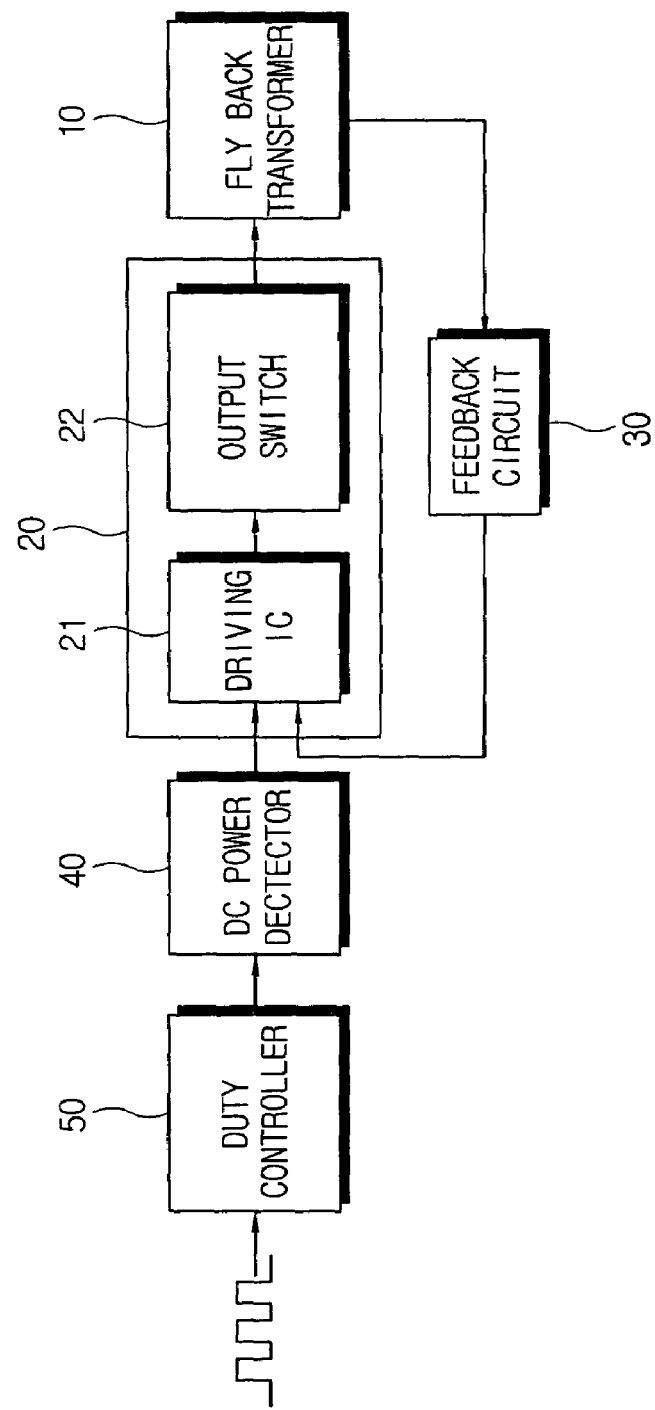
FIG. 1 is a block diagram of a CRT display apparatus according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures.

FIG. 1 is a block diagram of a cathode ray tube (CRT) display apparatus according to an embodiment of the present invention.

As shown in FIG. 1, a CRT display apparatus comprises an FBT 10, a power controller 20, a feedback circuit 30, a direct current (DC) power detector 40, and a duty controller 50.

The FBT 10 comprises a plurality of mutually inductive induction coils having different turn ratios. The FBT 10 may also have an auxiliary high voltage driving circuit connected to a primary induction coil to control the driving of a power source.

The power controller 20 controls the source voltage of the FBT 10. The power controller 20 comprises an output switch 22 and a driving IC 21.

The output switch 22 switches the input of the source voltage applied to the primary induction coil of the FBT 10. According to an aspect of the present invention, the output switch 22 comprises a plurality of transistors which are electronic switch components.

The driving IC 21 is supplied with a series of rectangular pulses and outputs a control signal to an output terminal. The series of rectangular pulses may be used as a synchronization signal. The series of rectangular pulses goes through an internal signal process such as a decoding process if the rectangular pulses are a decoded signal such as a PWM signal. According to an aspect of the present invention, the control signal at the output terminal may comprise a PWM signal having a different duty ratio from that of the input signal.

The feedback circuit 30 stabilizes the output voltage of the FBT 10 and feeds back the output voltage of the FBT 10 to the driving IC 21 to enable the driving IC 21 to output the PWM signal to stabilize the output voltage of the FBT 10.

The DC power detector 40 is connected to an input of the power controller 20 and outputs a shut-off signal to shut off the power controller 20 when a direct current signal is detected. To shut off the DC power signal, the DC power detector 40 may use capacitors connected in series to a line supplied with a rectangular pulse to bypass an alternating current component.

The duty controller 50 controls the pulse width of the rectangular pulse supplied to an integrated circuit, and outputs the pulse-width-controlled rectangular pulse to the DC power detector 40. If the rectangular pulse is used not only for high voltage driving but also for other purposes, the duty controller 50 is very useful in controlling a duty ratio of the rectangular pulse supplied to the driving IC 21.

The driving IC 21 operates normally when supplied with a series of rectangular pulses. However, the operation of the driving IC 21 becomes unpredictable if the supplied series of the rectangular pulses becomes a direct current signal because of abnormal operation of the system. If the series of the rectangular pulses becomes a direct current signal, the DC power detector 40 detects the change and controls the driving IC 21 not to output the control signal.

In other words, if the series of the rectangular pulses becomes a direct current signal, the duty controller 50 outputs the direct current signal without controlling the duty ratio. The DC power detector 40 detects the direct current signal and controls the driving IC 21. Herein, the DC power detector 40 shuts off the control signal output from the driving IC 21 or prevents the output signal from triggering any operation in the output of the circuit.

Figure 2:
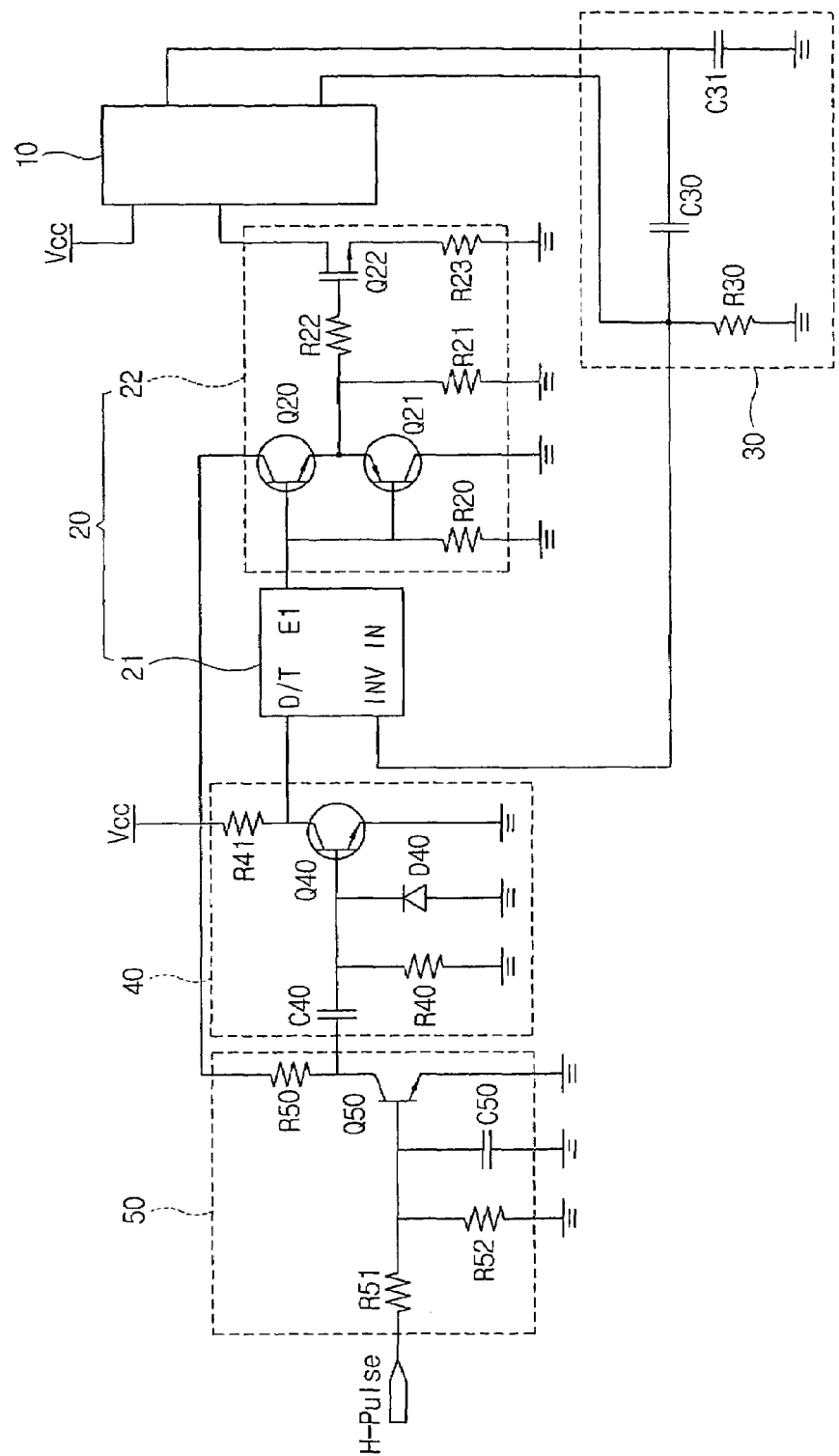
FIG. 2 is a circuit diagram of the CRT display apparatus according to an embodiment of the present invention.

FIG. 2 is a circuit illustrating a configuration of a CRT display apparatus according to an embodiment of the present invention.

As shown therein, the CRT display apparatus comprises a FBT 10, a power controller 20, a feedback circuit 30, a DC power detector 40, and a duty controller 50.

The FBT 10 comprises a plurality of induction coils having different turning ratios and a plurality of pin terminals connectable to an outer circuit.

The power controller 20 comprises an output switch 22 and a driving IC 21.

The output switch 22 comprises bipolar-junction transistors (BJT) Q20 and Q21, an N-MOSFET Q22, and resistors R20 through R23. The output switch 22 switches the input of a source power supplied to the FBT module 10.

In one aspect of the present invention, the BJTs Q20 and Q21 are connected in series and are of npn-type and pnp-type, respectively. Herein, the base terminals of the BJTs Q20 and Q21 are connected to receive a common bias voltage.

If a high signal is applied to the base terminal, the BJT Q21 (PNP) turns off, while the BJT Q20 (NPN) turns on. Accordingly, the N-MOSFET Q22 turns on.

If a low signal is applied to the base terminal, the BJT Q21 (PNP) is turned on, while the BJT Q20 (NPN) and the N-MOSFET Q22 are turned off. Also, conductive electric charges in a capacitor internally formed between a gate terminal and the other terminals flow to a ground terminal.

As the on/off status of the N-MOSFET Q22 changes, the source power supplied to the primary induction coil of the FBT 10 induces a high voltage in the secondary coil.

In an aspect of the present invention, the driving IC 21 uses a model TL494CN as a PWM control IC.

A D/T terminal of the driving IC 21 is used as an input terminal to receive a PWM signal, or a dead time control terminal.

An E1 terminal is an output terminal to output a control signal to switch the output switch 22 connected thereto.

According to an object of the present invention, the input signal of the D/T terminal and the output signal of the E1 terminal are PWM signals, and the output signal is based on the input PWM signal. Herein, a duty ratio of the output PWM signal is adjusted not only by the input PWM signal, but also by an output of an internal error amplifying circuit. The error amplifying circuit is supplied with an input voltage for smooth initiation and a feedback signal to stabilize the output from the FBT 10.

The feedback circuit 30 comprises capacitors C30 and C31, and a resistor R30 which is connected to the output terminal of the FBT 10. The feedback circuit 30 feeds the output voltage back to an INV IN terminal (an inverted input terminal) of the driving IC 21.

The DC power detector 40 comprises a transistor Q40, a capacitor C40, a diode D40, and resistors R40 and R41.

The transistor Q40 is switched according to a signal input to its base terminal. If the transistor Q40 is turned off, it supplies the DC voltage normally applied to its collector terminal to the D/T input terminal of the driving IC 21.

The capacitor C40 couples the DC (direct current) voltage to transfer an AC (alternating current) signal to the base terminal. Particularly, if the supplied voltage takes the form of series of rectangular pulses ranging from 0V to 5V and having a duty ratio of 50%, the voltage supplied to the base terminal becomes a P-P (peak to peak) waveform of 2.5V.

If the AC voltage bypassing the capacitor C40 has a negative value, the diode D40 is supplied with current and clamps the voltage on the base terminal so that the voltage equals 0V. Herein, the current flows from one ground terminal to another ground terminal via the diode D40 and the resistor R40.

The resistor R41 in the DC power detector 40 is used as a pull-up resistor.

The duty controller 50 comprises a transistor Q50, a capacitor C50, and resistors R50 through R52.

The base terminal of the transistor Q50 is supplied with the series of rectangular pulses from an H-pulse terminal. The series of rectangular pulses may be a waveform having a duty ratio of 50%. However, the PWM signal input into the driving IC 21 may be set to have a different duty ratio.

In other words, if a series of rectangular pulses is applied, the capacitor C50 is charged. Meanwhile, if the series of rectangular pulses is at a low level, the capacitor C50 discharges. The high level portions of the series of rectangular pulse are applied at a frequency such that complete discharge of the capacitor C50 is prevented.

The capacitor C50 charges and discharges according to the input series of rectangular pulses. The switching of the transistor is decided based on an on/off time of the PWM signal based on the time constant of the circuit.

The duty controller 50 controls the duty ratio based on proper selection of the resistors R51 and R52, and the capacitance of the capacitor C50.

The resistor R50 in the duty controller 50 is a pull-up resistor.

Hereinbelow, the operation of a circuit according to an aspect of the present invention will be described in reference to FIG. 2.

If a normal series of rectangular pulses are inputted from the H-pulse terminal, the series of rectangular pulses, having a duty ratio transformed by the duty controller 50, is output through the transistor Q50.

The signal output from the transistor Q50 is DC-coupled by the capacitor C40 of the DC power detector 40, and clamped by the diode D40. The signal clamped by the diode D40 has the same duty ratio as the signal that is input into the DC power detector 40 and supplied to the base terminal of the transistor Q40.

The PWM signal is supplied to the D/T input terminal of the driving IC 21 according to the repeated on/off switching of the transistor Q40. Accordingly, the output switch 22 switches according to the PWM signal output from the driving IC 21, and the source voltage input into the FBT 10 is controlled according to the switching of the output switch 22. The high output voltage output from the FBT 10 is fed back by the feedback circuit 30. Accordingly, the driving IC 21 adjusts the duty ratio of the adjusted PWM signal and outputs the PWM signal.

If the H-pulse terminal is supplied with a direct current signal due to abnormal operation of the system, there exist the cases of a high level signal and a low level signal to take into consideration.

If the input signal has a high level, the capacitor C50 of the duty controller 50 is continuously charged, keeping the transistor Q50 in an on state. Accordingly, the DC power detector 40 is supplied with a low level signal.

The transistor Q40 of the DC power detector 40 remains in an off state as biased by the low level signal. The collector terminal of the transistor Q40 has a high level terminal voltage and the D/T terminal of the driving IC 21 is supplied continuously with a high level signal.

If the input signal has a low level, the transistor Q50 of the duty controller 50 maintains an off state, and the capacitor C40 of the DC power detector 40 is continuously supplied with a high level direct signal. Because the DC voltage supplied to the capacitor C40 is blocked by coupling, the transistor Q40 of the DC power detector 40 maintains an off state, and the D/T input terminal of the driving IC 21 is continuously supplied with a high level signal.

It is noted that the D/T input terminal of the driving IC 21 is continuously supplied with a high level signal regardless of the level of the signal input into the H-pulse terminal if the signal is a DC signal. If the D/T input terminal is continuously supplied with a high level signal, the E1 output terminal outputs a low level signal, and shuts off the switching operation of the output switch 22. Accordingly, the FBT module 10 has no output, and the switches Q20 through Q22 of the output switch 22 are protected from power surges.

The CRT display apparatus according to an embodiment of the present invention provides normal operation of a system while protecting circuit components from abnormal operation of the system.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A cathode ray tube display apparatus having a fly back transformer which induces and outputs a high voltage, the cathode ray tube apparatus comprising:
   a power controller to control a source power input into the fly back transformer;
   a DC power detector which outputs a shut-off signal to shut off an operation of the power controller if the DC power detector detects a direct current signal; and
   a duty controller to which a series of rectangular pulses is input, wherein the duty controller changes a duty ratio of the series of rectangular pulses and outputs the series of rectangular pulses to the DC power detector.

2. The cathode ray tube display apparatus according to claim 1, wherein the DC power detector comprises:
   a capacitor;
   a line supplied with the direct current signal, the line being connected in series with the capacitor; and
   a transistor biased by an alternating current signal which passes through the capacitor,
   wherein the transistor outputs the shut-off signal to the power controller if the direct current signal is input into the capacitor.

3. The cathode ray tube display apparatus according to claim 1, wherein the power controller comprises:
   an output switch to switch an input of the source power; and
   a high voltage driving IC to control turning the output switch on/off.

4. The cathode ray tube display apparatus according to claim 2, wherein the power controller comprises:
   an output switch to switch an input of the source power; and
   a high voltage driving IC to control turning the output switch on/off.

5. The cathode ray tube display apparatus according to claim 2, further comprising a duty controller to which a series of rectangular pulses is input, wherein the duty controller changes a duty ratio of the series of rectangular pulses and outputs the series of rectangular pulses to the DC power detector.

6. The cathode ray tube display apparatus according to claim 1, further comprising a feedback circuit to feed back an output voltage of the fly back transformer to the power controller, wherein the power controller controls the source power according to the output voltage of the fly back transformer.

7. The cathode ray tube display apparatus according to claim 2, further comprising a feedback circuit to feed back an output voltage of the fly back transformer to the power controller, wherein the power controller controls the source power according to the output voltage of the fly back transformer.

8. The cathode ray tube display apparatus according to claim 3, wherein the output switch comprises a plurality of transistors which are electronic switch components.

9. The cathode ray tube display apparatus according to claim 3, wherein high voltage driving IC is supplied with a series of rectangular pulses and outputs a control signal to an output terminal.

10. The cathode ray tube display apparatus according to claim 1, wherein if the series of rectangular pulse becomes a direct current signal, the DC power detector detects the change and controls the high voltage driving IC not to output the signal.

11. A method of protecting circuit components in a cathode ray tube apparatus having a fly back transformer and a high voltage driving IC between an input signal and the fly back transformer, the method comprising:
    supplying the high voltage driving IC circuit, which is between the input signal and the fly back transformer, with the input signal;
    outputting an output signal from the high voltage driving IC to the fly back transformer during normal operation; and
    feeding back an output voltage of the fly back transformer to the high voltage driving IC, wherein the high voltage driving IC controls the source cower according to the output voltage of the fly back transformer, and
    wherein the high voltage driving IC stops outputting the output signal to the fly back transformer when the input signal is a direct current signal.

12. The method of claim 11, further comprising, feeding back an output voltage of the fly back transformer to the high voltage driving IC such that the high voltage driving IC pulse width modulates the output signal to the fly back transformer to stabilize the output voltage of the fly back transformer.

13. A cathode ray tube display apparatus which receives an input signal, the cathode ray tube apparatus comprising:
    a fly back transformer to induce and output a high voltage;
    a duty controller which receives the input signal, controls a pulse width of the input signal, and outputs a pulse width controlled rectangular pulse;
    a DC power detector which receives the pulse width controlled rectangular pulse from the duty controller, detects whether the pulse width controlled rectangular pulse is a direct current signal, and if the direct current signal is detected, outputs a shut-off signal; and
    a power controller which receives the pulse width controlled rectangular pulse if the direct current signal is not detected and receives the shut-off signal if the direct current signal is detected, the power controller comprising:
        a driving IC which processes the pulse width controlled rectangular pulse and outputs a processed signal, and
        an output switch which switches an input of a source voltage supplied to the fly back transformer according to the processed signal output from the driving IC,
    wherein when the DC power detector detects the direct current signal, the shut-off signal is received by the power controller and the power controller is shut off.

14. The apparatus of claim 13, further comprising a feed back circuit to feed back the high voltage of the fly back transformer to the driving IC such that the driving IC pulse width modulates the processed signal to the fly back transformer to stabilize the high voltage of the fly back transformer.

* * * * *

UNITED STATES PATENT AND TRADEMARK OFFICE
CERTIFICATE OF CORRECTION

| | | |
|---|---|---|
| PATENT NO. | : 7,221,112 B2 | Page 1 of 1 |
| APPLICATION NO. | : 10/930836 | |
| DATED | : May 22, 2007 | |
| INVENTOR(S) | : Sung-cheol Ko | |

It is certified that error appears in the above-identified patent and that said Letters Patent is hereby corrected as shown below:

Column 7, Line 16, change "cower" to --power--.

Signed and Sealed this

Eighteenth Day of September, 2007

JON W. DUDAS
*Director of the United States Patent and Trademark Office*